United States Patent [19]

Iwamura et al.

[11] Patent Number: 5,828,752
[45] Date of Patent: Oct. 27, 1998

[54] PSEUDO-RANDOM NUMBER GENERATOR AND COMMUNICATION SYSTEM EMPLOYING THE SAME

[75] Inventors: Keiichi Iwamura; Takahisa Yamamoto, both of Kawasaki, Japan

[73] Assignee: Canon Kabushiki Kaisha, Tokyo, Japan

[21] Appl. No.: 402,366

[22] Filed: Mar. 13, 1995

[30] Foreign Application Priority Data

Mar. 15, 1994 [JP] Japan .................................. 6-043544

[51] Int. Cl.$^6$ ................................ H04K 9/00; G06F 7/58
[52] U.S. Cl. ........................................ 380/46; 364/717.01
[58] Field of Search .............................. 380/46; 364/717, 364/717.01, 717.07; 331/78

[56] References Cited

U.S. PATENT DOCUMENTS

| 3,984,668 | 10/1976 | Zetterberg et al. | 235/152 |
| 4,133,974 | 1/1979 | Morgan | 380/46 |
| 5,187,676 | 2/1993 | DeVane | 364/717 |
| 5,313,530 | 5/1994 | Iwamura | 380/28 |
| 5,420,928 | 5/1995 | Aiello et al. | 380/46 |
| 5,515,307 | 5/1996 | Aiello et al. | 364/717 |
| 5,535,140 | 7/1996 | Iwamura | 364/550 |
| 5,604,752 | 2/1997 | Iwamura | 371/37.1 |

FOREIGN PATENT DOCUMENTS 61-239328   10/1986   Japan ................................ G06F 7/58

OTHER PUBLICATIONS

"Fugou Riron Coding Theory", Miyakawa, et al., published by Shokodo p. 311 line 1 —p. 313 line 7.

"Gendai Angou Riron" (Moder Encryption Theory), N. Ikeno, et al., published by Denshinjoho Tsushin Gakkai p. 117 line 5 —p119 line 2.

Bruce Schneier, "Applied Cryptology: Protocols, Algorithms, and Source Code in C", 1st edition John Wiley and Sons, N.Y. (1992) pp. 168–172 (sec. 8.3) and pp. 356–367 (sec 15.2).

Bruce Schneier, "Applied Cryptology: Protocols, Algorithms, and Source Code in C", 2nd edition John Wiley and Sons, N.Y. (1995) pp. 197–198 (sec. 9.4).

*Primary Examiner*—Thomas H. Tarcza
*Assistant Examiner*—Pinchus N. Laufer
*Attorney, Agent, or Firm*—Fitzpatrick, Cella, Harper & Scinto

[57] ABSTRACT

A communication apparatus through which encryption/decryption processing can be executed at high speed includes a CPU for performing overall control of the apparatus, an encryption unit for encrypting communication data that has been stored in a RAM and outputting encrypted data, and a decryption unit for decrypting encrypted data transmitted from an external communication apparatus and storing the decrypted data in the RAM. The decryption unit issues a request to generate a series of random numbers serving as an encryption key necessary in decryption processing of the encrypted data applied thereto. A pseudo-random number generating circuit generates random numbers and delivers them to the decryption unit. The encryption unit issues a request to generate a series of random numbers serving as an encryption key necessary in encryption. The pseudo-random number generating circuit generates random numbers and delivers them to the encryption unit. The latter generates a cryptogram sentence based upon these random numbers.

24 Claims, 9 Drawing Sheets

PSEUDO-RANDOM NUMBER GENERATOR AND COMMUNICATION SYSTEM EMPLOYING THE SAME

BACKGROUND OF THE INVENTION

1. Field of the Invention

This invention relates to a pseudo-random number generating method and apparatus using a method and apparatus for generating random numbers in communication, especially encrypted communication. More particularly, the invention relates to a pseudo-random number generating method and apparatus employed in information processing such as a Monte Carlo simulation.

2. Description of the Related Art

The rapid progress that has recently been made in information communication systems using computer networks has led to greater importance being attached to encryption techniques for the purpose of protecting the content of data.

As for the random numbers used in encrypted communication, it is required that a series of random numbers to be generated from a certain point in time onward should not be readily understandable from a series of random numbers generated up to this point in time. A series of random numbers satisfying this condition is described in *Advances in Cryptology*, published by the Plenum Press in 1983. Specifically, letting a series of random numbers be represented by $\{b_1, b_2, \ldots\}$, a bit $b_i$ is given by the following:

$$b_i = [\text{least significant bit of } x_i] (i=1, 2, \ldots) \qquad (\text{Eq. 1})$$

where $x_i = x_{i-1}^2 \bmod n$ ($i=1, 2, \ldots$)

$x_0$: initial integer given arbitrarily by the user $n=p \cdot q$, ($p$, $q$ are prime numbers)

In the above-cited reference, it is disclosed that $b_{i+1}$ can be determined solely from $b_1, b_2, \ldots, b_i$ if one takes an amount of time equivalent to that which would needed to factorize $n$. Accordingly, in order to make factorization difficult, it is required that $n = p \cdot q$ be given a length of several hundred bits. A problem which arises in such case is that computing $x^2$ (mod $n$) takes too much time.

The following technique utilizing the fact that $n=p \cdot q$ holds and employing the Chinese remainder theorem is known:

$$x_i = a \cdot p \cdot z_i + b \cdot q \cdot y_i (\bmod n) \qquad (\text{Eq. 2})$$

where $y_i = y_{i-1}^2 \bmod p$ \qquad (Eq. 3)

$z_i = z_{i-1}^2 \bmod q$ \qquad (Eq. 4)

$y_0$, $z_0$: initial integers given arbitrarily by the user $$a \cdot p + b \cdot q = 1 (\bmod n) \qquad (\text{Eq. 5})$$

The Chinese remainder theorem is described, by way of example, in "Fugou Riron (Coding Theory)" (by Miyakawa, Iwatare, Imai), published by Shokodo. By using the Chinese remainder theorem, Equations 3 and 4 can be implemented by the four-rule operations of a number less than max($p,q$), which is half the number of bits of $n$. This method is advantageous in that it is faster than the arithmetic operation of Equation 1 implemented by four-rule operations with the numbers less than $n$.

Further, the specification of Japanese Patent Application Laid-Open (KOKAI) No. 61-239328 illustrates the following technique, in which the operation of Equation 2 is modified:

$$x_i = [a \cdot (z_i - y_i)(\bmod q)] \cdot p + y_i \qquad (\text{Eq. 6})$$

Equation 6 is established by substituting $b \cdot q$ of Equation 5 for that of Equation 2. Further, $x_i$ obtained from Equation 6 is smaller than $n=p \cdot q$, as indicated by the following equation:

$$0 \le [a \cdot (z_i - y_i)(\bmod q)] \cdot p + y_i \le (q-1) \cdot p + p - 1 = n-1 \qquad (\text{Eq. 7})$$

Though Japanese Patent Application Laid-Open (KOKAI) No. 61-239328 illustrates that Equation 6 also is advantageous in that it can be implemented by four-rule operations with input of a number of less than max($p,q$), $n$ is an integer on the order of several hundred bits. Accordingly, even if the number is less than max($p,q$), computation of a large integer is necessary, computation time is prolonged and the scale of processing circuitry is increased.

SUMMARY OF THE INVENTION

An object of the present invention is to provide a communication method and apparatus through which encryption/decryption processing can be executed at high speed.

Another object of the present invention is to provide a method and apparatus through which pseudo-random numbers can be generated at high speed.

According to the present invention, the foregoing objects are attained by the apparatus or methods described below.

Specifically, the present invention provides a communication apparatus comprising $y_i$ operating means for outputting $y_i$ ($i=0, 1, 2, \ldots, n$) upon performing an operation of a recurrence formula "$y_i = f(y_{i-1}) \bmod p$; ($i=1, 2, \ldots, n-1$)" based upon a prescribed initial value $y_0$, a prescribed prime number $p$ and a function $f(y_{i-1})$ of $y_{i-1}$; $z_i$ operating means for outputting $z_i$ ($i=0, 1, 2, \ldots, n$) upon performing an operation of a recurrence formula "$z_i = g(z_{i-1}) \bmod q$; ($i=1, 2, \ldots, n-1$)" based upon a prescribed initial value $z_0$, a prescribed prime number $q$ and a function $g(z_{i-1})$ of $z_{i-1}$; $m_i$ operating means for extracting prescribed lower order bits out of $m_i$ ($i=0, 1, 2, \ldots, n$) upon performing an operation of a remainder formula "$m_i = a \cdot (z_i - y_i) \bmod q$" based upon a prescribed coefficient $a$ and the prescribed prime number $q$; prescribed bit operating means for multiplying said prescribed lower order bits extracted from $m_i$ and said prescribed lower order bits extracted from the prescribed prime number $p$, adding prescribed bits of $y_i$ to a result of multiplication and adopting prescribed lower order bits of a result of addition as an i-th pseudo-random number $x_i$ ($i=0, 1, 2, \ldots, n$); encryption means for generating a cryptogram from a plain text on the basis of the pseudo-random number $X_i$ ($i=0, 1, 2, \ldots, n$) generated by said prescribed bit operating means; and output means for outputting the cryptogram.

Further, the present invention provides a communication apparatus comprising $y_i$ operating means for outputting $y_i$ ($i=0, 1, 2, \ldots, n$) upon performing an operation of a recurrence formula "$y_i = f(y_{i-1}) \bmod p$; ($i=1, 2, \ldots, n-1$)" based upon a prescribed initial value $y_0$, a prescribed prime number $p$ and a function $f(y_{i-1})$ of $y_{i-1}$; $z_i$ operating means for outputting $z_i$ ($i=0, 1, 2, \ldots, n$) upon performing an operation of a recurrence formula "$z_i = g(z_{i-1}) \bmod q$; ($i=1, 2, \ldots, n-1$)" based upon a prescribed initial value $z_0$, a prescribed prime number $q$ and a function $g(z_{i-1})$ of $z_{i-1}$; $m_i$ operating means for extracting prescribed lower order bits out of $m_i$ ($i=0, 1, 2, \ldots, n$) upon performing an operation of a remainder formula "$m_i = a \cdot (z_i - y_i) \bmod q$" based upon a prescribed coefficient a and the prescribed prime number q; prescribed bit operating means for multiplying said prescribed lower order bits extracted from $m_i$ and said prescribed lower order bits extracted from the prescribed prime number p, adding prescribed lower order bits of $y_i$ to a result of multiplication and adopting prescribed lower order bits of a result of addition as an i-th pseudo-random number $X_i$ (i=0, 1, 2, . . . , n); and decryption means for generating a cryptogram from a received plain text on the basis of the pseudo-random number $X_i$ (i=0, 1, 2, . . . , n) generated by said prescribed bit operating means.

Further the present invention provides a pseudo-random number generator for generating a random number $X_i$ (i=0, 1, 2, . . . , n), comprising $y_i$ operating means for outputting $y_i$ (i=0, 1, 2, . . . , n) upon performing an operation of a recurrence formula "$y_i=f(y_{i-1})$ mod p; (i=1, 2, . . . , n-1)" based upon a prescribed initial value $y_0$, a prescribed prime number p and a function $f(y_{i-1})$ of $y_{i-1}$; $z_i$ operating means for outputting $z_i$ (i=0, 1, 2, . . . , n) upon performing an operation of a recurrence formula "$z_i=g(z_{i-1})$ mod q; (i=1, 2, . . . , n-1)" based upon a prescribed initial value $z_0$, a prescribed prime number q and a function $g(z_{i-1})$ of $z_{i-1}$; $m_i$ operating means for extracting prescribed lower order bits out of $m_i$ (i=0, 1, 2, . . . , n) upon performing an operation of a remainder formula "$m_i=a\cdot(z_i-Y_i)$ mod q" based upon a prescribed coefficient a and the prescribed prime number q; and prescribed bit operating means for multiplying said prescribed lower order bits extracted from $m_i$ and said prescribed lower order bits extracted from the prescribed prime number p, adding prescribed lower order bits of $y_i$ to a result of multiplication and adopting prescribed lower order bits of a result of addition as an i-th pseudo-random number $X_i$ (i=0, 1, 2, . . . , n).

Further, the present invention provides a communication method comprising the steps of:

(a) outputting $y_i$ (i=0, 1, 2, . . . , n) upon performing an operation of a recurrence formula "$y_i=f(y_{i-1})$ mod p; (i=1, 2, . . . , n-1)" based upon a prescribed initial value $y_0$, a prescribed prime number p and a function $f(y_{i-1})$ of $y_{i-1}$;

(b) outputting $z_i$ (i=0, 1, 2, . . . , n) upon performing an operation of a recurrence formula "$z_i=g(z_{i-1})$ mod q; (i=1, 2, . . . , n-1)" based upon a prescribed initial value $z_0$, a prescribed prime number q and a function $g(z_{i-1})$ of $z_{i-1}$;

(c) extracting prescribed lower order bits out of $m_i$ (i=0, 1, 2, . . . , n) upon performing an operation of a remainder formula "$m_i=a\cdot(z_i-y_i)$ mod q" based upon a prescribed coefficient a and the prescribed prime number q;

(d) multiplying prescribed lower order bits extracted from $m_i$ and prescribed lower order bits extracted from the prescribed prime number p, adding a prescribed lower order bits of $y_i$ to a result of multiplication and adopting prescribed lower order bits of a result of addition as an i-th pseudo-random number $X_i$ (i=0, 1, 2, . . . , n);

(e) generating a cryptogram from a plain text on the basis of the pseudo-random number $X_i$ (i=0, 1, 2, . . . , n) generated at said step (d); and (f) outputting the cryptogram.

Further, the present invention provides a communication method comprising the steps of:

(a) outputting $y_i$ (i=0, 1, 2, . . . , n) upon performing an operation of a recurrence formula "$y_i=f(y_{i-1})$ mod p; (i=1, 2, . . . , n-1)" based upon a prescribed initial value $y_0$, a prescribed prime number p and a function $f(y_{i-1})$ of $y_{i-1}$;

(b) outputting $z_i$ (i=0, 1, 2, . . . , n) upon performing an operation of a recurrence formula "$z_i=g(z_{i-1})$ mod q; (i=1, 2, . . . , n-1)" based upon a prescribed initial value $z_0$, a prescribed prime number q and a function $g(z_{i-1})$ of $z_{i-1}$;

(c) extracting prescribed lower order bits out of $m_i$ (i=0, 1, 2, . . . , n) upon performing an operation of a remainder formula "$m_i=a\cdot(z_i-y_i)$ mod q" based upon a prescribed coefficient a and the prescribed prime number q;

(d) multiplying prescribed lower order bits extracted from $m_i$ and prescribed lower order bits extracted from the prescribed prime number p, adding prescribed lower order bits of $y_i$ to a result of multiplication and adopting prescribed lower order bits of a result of addition as an i-th pseudo-random number $X_i$ (i=0, 1, 2, . . . , n); and (e) generating a cryptogram from a received plain text on the basis of the pseudo-random number $X_i$ (i=0, 1, 2, . . . , n) generated at said step (d).

Further, the present invention provides a pseudo-random number generating method for generating a random number $X_i$ (i=0, 1, 2, . . . , n), comprising the steps of:

(a) outputting $y_i$ (i=0, 1, 2, . . . , n) upon performing an operation of a recurrence formula "$y_i=f(y_{i-1})$ mod p; (i=1, 2, . . . , n-1)" based upon a prescribed initial value $y_0$, a prescribed prime number p and a function $f(y_{i-1})$ of $y_{i-1}$;

(b) outputting $z_i$ (i=0, 1, 2, . . . , n) upon performing an operation of a recurrence formula "$z_i=g(z_{i-1})$ mod q; (i=1, 2, . . . , n-1)" based upon a prescribed initial value $z_0$, a prescribed prime number q and a function $g(z_{i-1})$ of $z_{i-1}$;

(c) extracting prescribed lower order bits out of $m_i$ (i=0, 1, 2, . . . , n) upon performing an operation of a remainder formula "$m_i=a\cdot(z_i-y_i)$ mod q" based upon a prescribed coefficient a and the prescribed prime number q; and (d) multiplying said prescribed lower order bits extracted from $m_i$ and said prescribed lower order bits extracted from the prescribed prime number p, adding a prescribed lower order bits of $y_i$ to a result of multiplication and adopting prescribed lower order bits of a result of addition as an i-th pseudo-random number $X_i$ (i=0, 1, 2, . . . , n).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the accompanying drawings.

[Overview of the Invention]

The embodiments of the invention provide a high-speed arithmetic method and apparatus for obtaining a random-number series $b_i$ (i=1, 2, ...) through an operation with the numbers sufficiently smaller than max(p,q) in order to solve the aforementioned problems, as well as a communication method and apparatus for performing encrypted communication processing a high speed using the high-speed arithmetic method and apparatus.

Each of the random-number series $b_i$ (i=1, 2, ...) obtained is the least significant bit of $x_i$, respectively, as mentioned above. When $x_i$ is computed by Equation 1, all bits of $x_i$ are necessary to compute the next $x_{i+1}$. When $x_i$ is computed by Equation 2 or 6, however, $x_i$ is unrelated to computation of $x_{i+1}$. However, all bits of $y_i$, $z_i$ are required to compute $y_{i+1}$, $z_{i+1}$ for generation of $x_{i+1}$. Accordingly, it is not required that the operation of Equation 2 or 6 be carried out with respect to all bits of $x_i$, and it will suffice to perform the computation of the least significant bit in the following manner:

$$b_i = c \cdot d + e \qquad \text{Eq. (8)}$$

where c: least significant bit of $m = [a \cdot (z_i - y_i) \pmod{q}]$
d: least significant bit of p
e: least significant bit of $y_i$
+ exclusive-OR operator It is known that the random-number series $b_i$ need not consist of just the least significant bit of $x_i$, and that if the series $b_i$ consist of lower order bits of $x_i$ where the number of lower order bits is on the order of $\log_2 n$, the stability of the random-number series $b_i$ will not change. In this case, c, d and e can each be a plurality of bits and not the least significant bit, but it is clear that the operation involved will be sufficiently small in comparison with max(p,q).

[First Embodiment]

Figure 1:
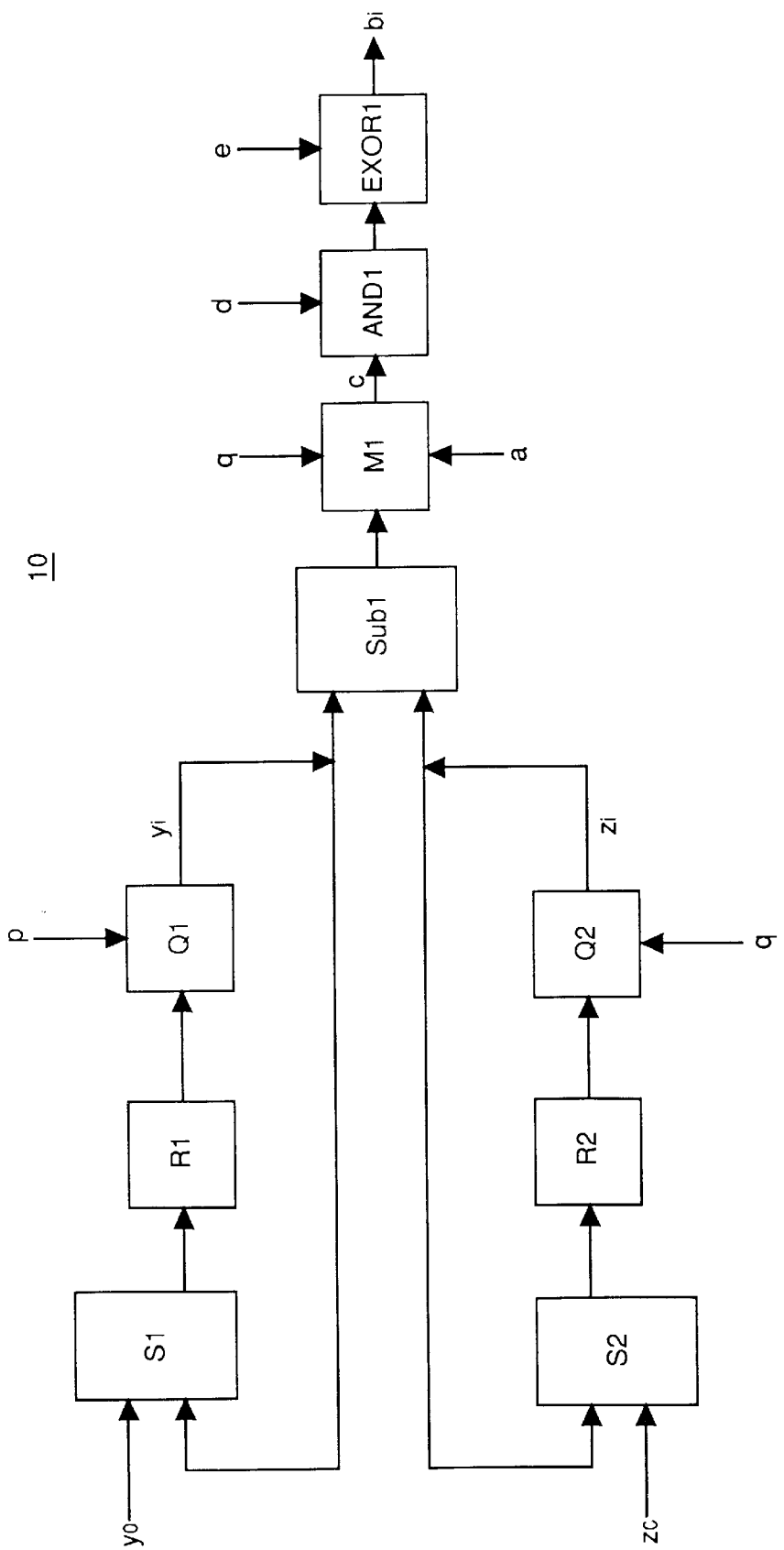
FIG. 1 is a diagram for describing the construction of a pseudo-random number generating circuit according to a first embodiment of the present invention.

FIG. 1 illustrates the construction of a pseudo-random number generator 10 according to a first embodiment of the invention. The generator 10 basically performs the operation of Equation 8 above.

As shown in FIG. 1, the generator 10 includes selectors S1, S2 and registers R1, R2. The selectors S1, S2 select $y_0$, $z_0$, respectively, which are applied in the initial state, and store $y_0$, $z_0$ in the registers R1, R2, respectively. Following the initial state, the outputs of remainder squaring circuits Q1, Q2, described below, are selected and stored in the registers R1, R2, respectively. Using the above-mentioned prime numbers p, q, the remainder squaring circuits Q1, Q2 perform the following operations with respect to integers $y_{i-1}$, $z_{i-1}$ being stored in the registers R1, R2, respectively:

$$y_i = y_{i-1}^2 \pmod{p}$$

$$z_i = z_{i-1}^2 \pmod{q}$$

The generator 10 further includes a subtracting circuit Sub1 and a remainder multiplying circuit M1. The subtracting circuit Sub1 computes $z_i - y_i$ from its inputs $y_i$, $z_i$, and the remainder multiplying circuit M1 performs the operation $$m = a \cdot (z_i - y_i) \pmod{q}$$

The output from the remainder multiplying circuit M1 need be only the least significant bit c of m and not all bits. AND1 represents a one-bit AND gate, and EXOR1 denotes a one-bit ex-OR gate. The AND gate AND1 takes the logical product of the least significant bit c of m and the least significant bit d of p, and the ex-OR gate EXOR1 takes the exclusive-OR of this output of the gate AND1 and the least significant bit e of $y_i$, with the result of this operation being outputted as the random number $b_i$.

[Second Embodiment]

Figure 2:
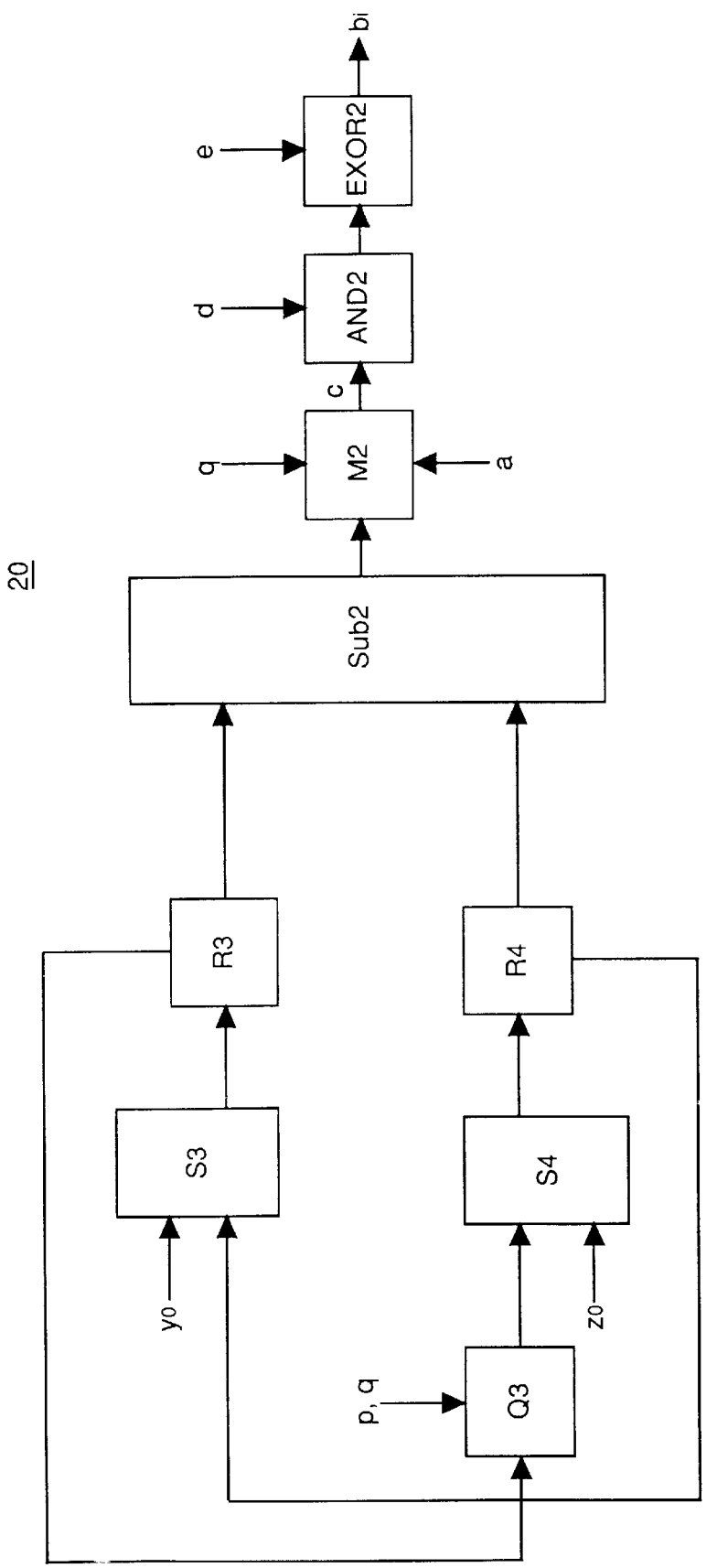
FIG. 2 is a diagram for describing the construction of a pseudo-random number generating circuit according to a second embodiment of the present invention.

FIG. 2 illustrates the construction of a pseudo-random number generator 20 according to a second embodiment of the invention. The generator 20 basically performs the operation of Equation 8 above.

In FIG. 2, selectors S3, S4 select $y_0$, $z_0$, respectively, which are applied in the initial state. Following the initial state, the selectors S3, S4 select the outputs of register R4 and remainder squaring circuit Q3, respectively. The selected outputs are stored in registers R3, R4, respectively. The remainder squaring circuit Q3 squares its input value, divides the resulting value by p or q and then outputs the remainder. Here p and q are alternated, starting with p. In other words, p and q are entered into the remainder squaring circuit Q3 in alternating fashion. Processing from a subtracting circuit Sub2 onward is executed only at the moment the remainder squaring circuit Q3 uses p. The reason for this is that $y_i$, $z_i$ are stored in the registers R3, R4 immediately before this point in time. The processing from a subtracting circuit Sub2 onward is similar to that of the first embodiment. That is, the subtracting circuit Sub2 computes $z_i - y_i$ from its inputs $y_i$, $z_i$, and a remainder multiplying circuit M2 performs the operation $$m = a \cdot (z_i - y_i) \pmod{q}$$

The output from the remainder multiplying circuit M2 need be only the least significant bit c of m and not all bits. AND2 represents a one-bit AND gate, and EXOR2 denotes a one-bit ex-OR gate. The AND gate AND2 takes the logical product of the least significant bit c of m and the least significant bit d of p, and the ex-OR gate EXOR2 takes the exclusive-OR of this output and the least significant bit e of $y_i$, with the result of this operation being outputted as the random number $b_i$.

[Third Embodiment]

It is known that $b_i$ need not be just the least significant bit; if the number of bits is on the order of $\log_2 n$, the stability of the random number $b_i$ will not decline even when a plurality of lower bits of $x_i$ are used as $b_i$. Accordingly, if we take u bits from the least significant place of $x_i$, Equation 8 becomes as follows:

$$b_i = c \cdot d + e \qquad \text{Eq. (8'')}$$

where c: value of u bits from least significant place of
$m=[a\cdot(z_i-y_i) \pmod q)]$ d: value of u bits from least significant place of p e: value of u bits from least significant place of $y_i$ +: logical addition operator Accordingly, Equation 8" is an operation involving a plurality of bits, but it is clear that the operation is sufficiently small in comparison with max(p,q).

The pseudo-random number generator of the third embodiment basically can be implemented by performing a simple extension of the operational bits in the first embodiment described in connection with FIG. 1.

Figure 3:
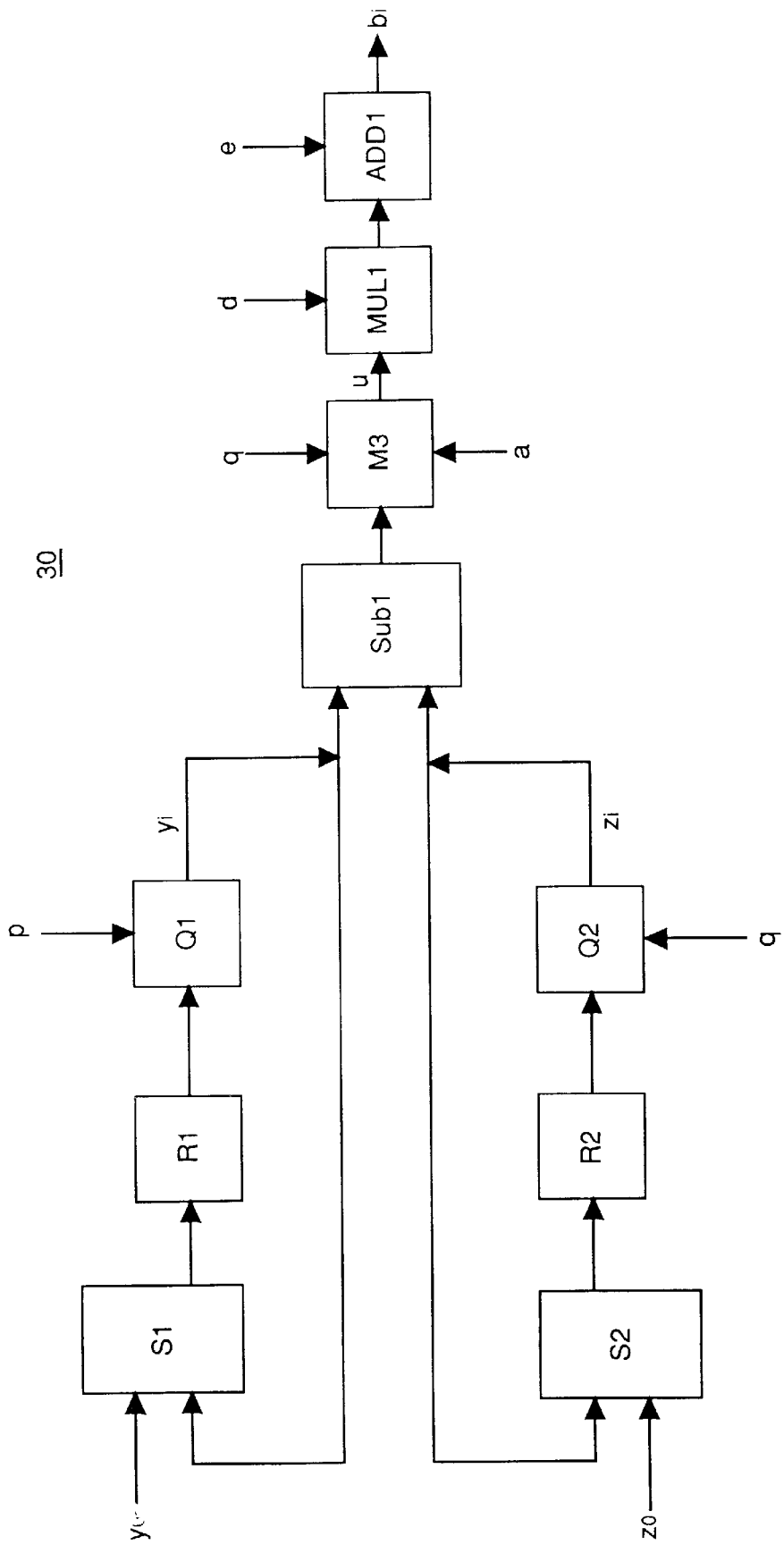
FIG. 3 is a diagram for describing the construction of a pseudo-random number generating circuit according to a third embodiment of the present invention.

FIG. 3 illustrates the construction of a pseudo-random number generator 30 according to the third embodiment of the invention. A comparison with FIG. 1 shows that the construction of the generator is identical up to the subtracting circuit Sub1 and has different components following the subtracting circuit Sub1. Only the different components will be described.

The output of the computation "$z_i-y_i$" from the subtracting circuit Sub1 in FIG. 3 enters a remainder multiplying circuit M3, and so do q and a. After the remainder multiplying circuit M3 performs the operation $$m=a\cdot(z_i-y_i)(\bmod q)$$

u bits are extracted from the least significant bit of m, which is the result of the operation, and this is entered into a multiplying circuit MUL1. Further, "d", which is u bits from the least significant bit of p, is entered into the multiplying circuit MUL1 simultaneously. The multiplying circuit MUL1 performs the multiplication (u bits)×(u bits) and enters the lower order u bits of the product into an adder ADD1. The latter, to which e is simultaneously applied as an input, adds e to the value of the lower order u bits of the result of multiplication. The lower order u bits of the resulting sum is outputted as the random number $b_i$.

[Fourth Embodiment]

The pseudo-random number generator of the fourth embodiment basically can be implemented by performing a simple extension of the operational bits in the second embodiment described in connection with FIG. 2.

Figure 4:
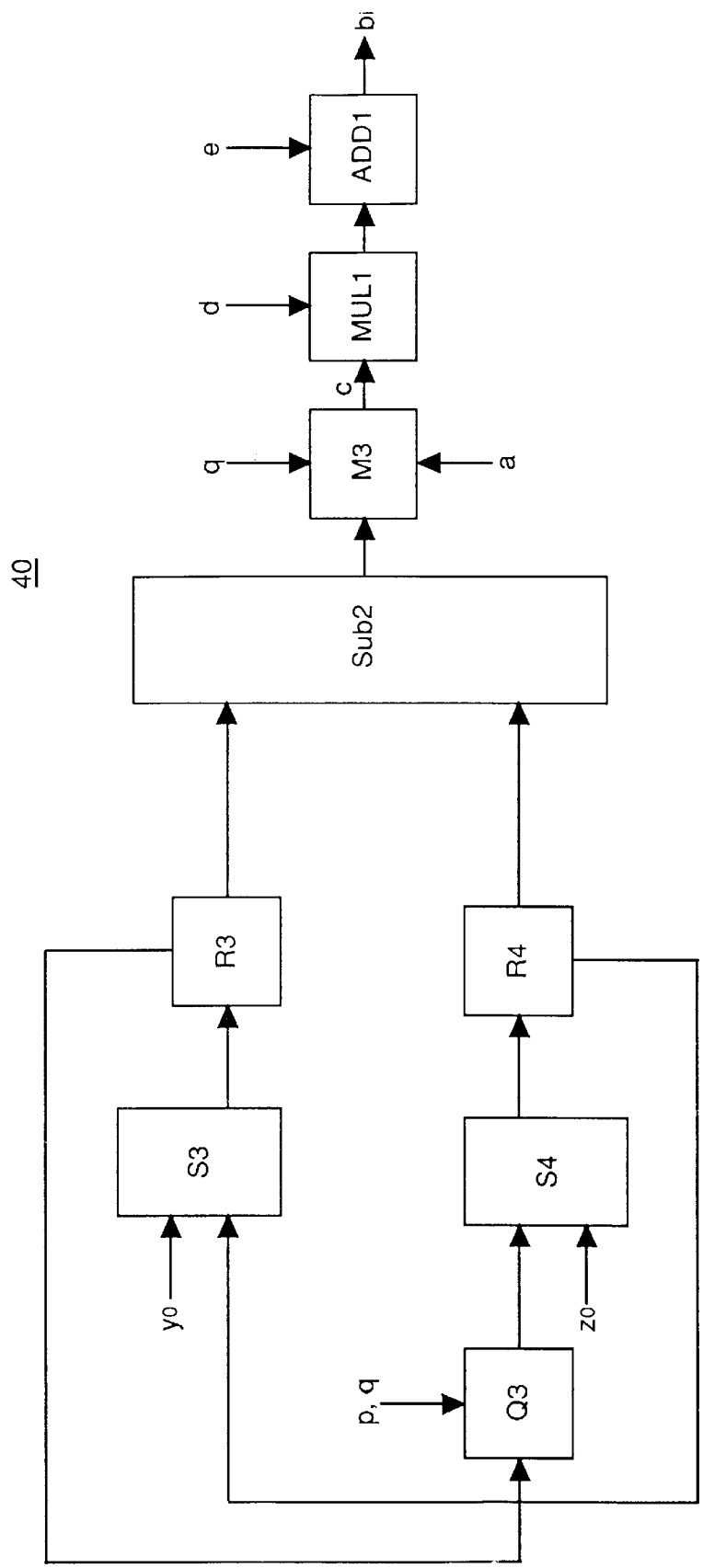
FIG. 4 is a diagram for describing the construction of a pseudo-random number generating circuit according to a fourth embodiment of the present invention.

FIG. 4 illustrates the construction of a pseudo-random number generator 40 according to the fourth embodiment of the invention. A comparison with FIG. 2 shows that the construction of the generator is identical up to the subtracting circuit Sub2 and has different components following the subtracting circuit Sub2. Only the different components will be described.

The result of the computation "$z_i-y_i$" output from the subtracting circuit Sub2 in FIG. 4 enters a remainder multiplying circuit M3, and so do q and a. After the remainder multiplying circuit M3 performs the operation $$m=a\cdot(z_i-y_i)(\bmod q)$$

u bits are extracted from the least significant bit of m, which is the result of the operation, and this is entered into a multiplying circuit MUL1. Further, "d", which is u bits from the least significant bit of p, is entered into the multiplying circuit MUL1 simultaneously. The multiplying circuit MUL1 performs the multiplication (u bits)×(u bits) and enters the lower order u bits of the product into an adder ADD1. The latter, to which e is simultaneously applied as an input, adds e to the value of the lower order u bits of the result of multiplication. The lower order u bits of the resulting sum is outputted as the random number $b_i$.

[Fifth Embodiment]

In the foregoing embodiments, the output is identical even if p and q are interchanged.

Further, in the foregoing embodiments, an example is described in which random numbers are generated using the polynomial $y_i=y_{i-1}^2$. However, it goes without saying that the invention is not limited solely to $y_i=y_{i-1}^2$ because the other polynomials more than quadratic which has the form $y_i=f(y_{i-1})$ can also be used.

Further, in the foregoing embodiments, circuit arrangements are described in which a series of pseudo-random numbers is generated at high speed based upon Equation 8 and Equation 8". However, in accordance with the embodiments of the invention, as opposed to the prior art, Equations 8 and 8" can be implemented by an integral operation which is sufficiently small in comparison with max(p,q). It goes without saying that these operations can be readily implemented even by executing software using a CPU or the like.

For example, in a case where n is an integer of 512 bits, u may be on the order of "$\log_2 n$", i.e., nine bits.

Further, in a case where encrypted communication is performed wherein a part of information is concealed as by using the Chinese remainder theorem in RSA encryption processing of the kind illustrated in "Gendai Angou Riron (Modern Encryption Theory)" (by Nobuichi Ikeno and Kenji Koyama), published by Denshinjoho Tsushin Gakkai, it is obvious that this embodiment of the invention can be applied to greatly reduce the amount of computation by calculation solely of the necessary portions.

[Sixth Embodiment]

The focus of the invention has been on a method and apparatus for generating pseudo-random numbers in which the processing for generating pseudo-random numbers is executed at high speed. In the sixth embodiment, reference is had to FIG. 5 to describe an example of a communication apparatus (1120) for encrypting and decrypting communication data, which uses this method and apparatus for generating pseudo-random numbers.

Figure 6:
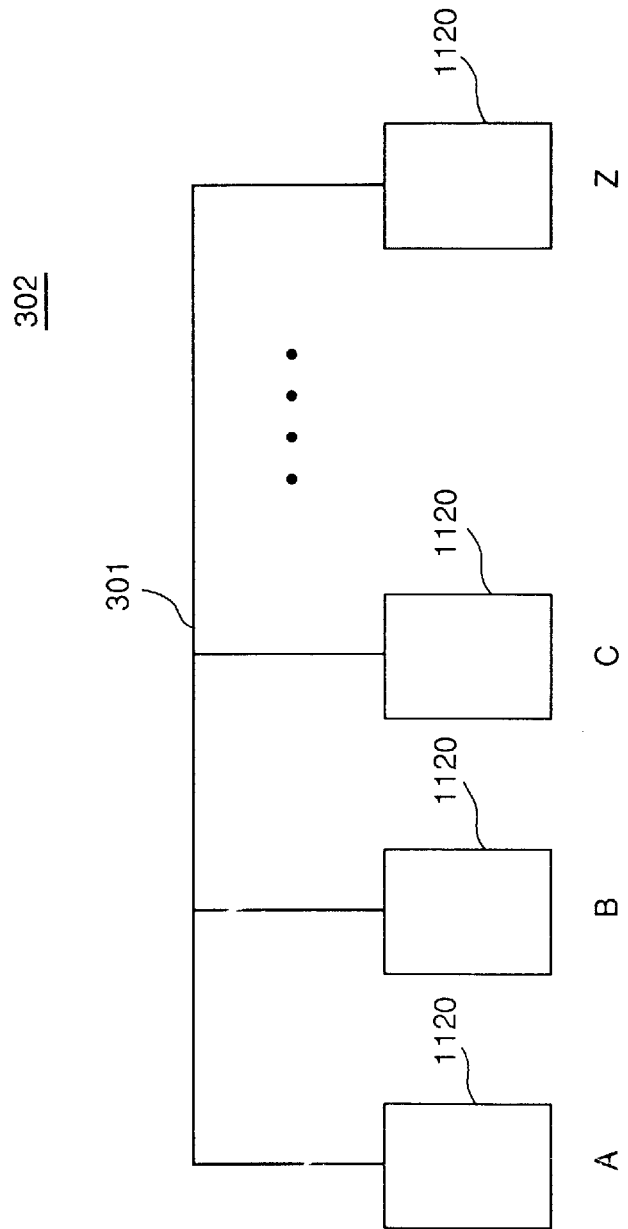
FIG. 6 is a diagram for describing the network connection of the communication apparatus according to the sixth embodiment.

FIG. 6 illustrates the construction of a one-to-one communication system 302 based upon the communication apparatus 1120 of the sixth embodiment. A connection 301 in FIG. 6 represents a local communication network such as a local area network (LAN) or wide area communication network such as a telephone line. Further, A~Z represent users of the respective communication apparatus 1120. Users employing these items of communication equipment or terminals are capable of communicating with other users by performing various operations including the above-described pseudo-random number generation processing using the method and apparatus for generating pseudo-random numbers of the embodiments of this invention.

The construction of the communication apparatus 1120 of the sixth embodiment will be described with reference to FIG. 5.

A CPU 1121 performs overall control of the communication apparatus 1120. The control program is stored in a ROM 1124 in advance and is executed by the CPU 1121. A keyboard 1122 serves as an input terminal for entering command and data into the communication apparatus 1120. A RAM 1123 stores communication data as well as working data which the CPU 1121 uses to execute various types of processing. A monitor 1125 displays the results of various processing in the communication apparatus 1120, communication data and input commands from the keyboard 1122. An encryption unit 1127 executes encryption processing of communication data stored in the RAM 1123 and outputs encrypted data on a communication line 1129. A decryption unit 1126 decrypts encrypted data, which is transmitted from an external communication apparatus via a communication line 1128, and stores the decrypted data in the RAM 1123. Numeral 200 denotes any one of the circuits for generating pseudo-random numbers described in FIGS. 1~4. The circuit 200 generates a series of random numbers as an encryption key on the basis of a request from the encryption unit 1127 or decryption unit 1126. The decryption unit 1126 requests that the circuit 200 generate a series of random numbers as an decryption key necessary for decryption processing of entered encrypted data. The generated series of random numbers enters the decryption unit 1126, which subjects the entered encrypted data to decryption processing using the series of random numbers as a decryption key, thereby producing a plain text. Further, when the encryption unit 1127 performs encryption processing of communication data, it requests the circuit 200 to execute processing for generating a series of random numbers as an encryption key and receives the generated series of random numbers as an input. The encryption unit 1127 then proceeds to use this series of random numbers as an encryption key to subject communication data, which is a plain text, to encryption processing, thereby generating a cryptogram.

It will suffice to adapt the encryption processing performed by the encryption unit 1127 so as to obtain encrypted data $\{r_i\}$ by performing a bit-by-bit exclusive-OR operation $r_i = s_i + b_i$ between communication data $\{s_i\}$ and a random-number series $\{b_i\}$ from the pseudo-random number generating circuit 200, in which the communication data $\{s_i\}$ is the result of separating communication data bit by bit. In this case, in the decryption processing performed by the decryption unit 1126, a random-number series $\{b_i\}$ identical with the random-number series used in the encryption processing is generated by the pseudo-random number generating circuit 200 based on the same initial value, and the communication data $\{s_i\}$ is obtained by a bit-by-bit exclusive-OR operation $s_i = r_i + b_i$ between the received communication data $\{r_i\}$ and a random-number series $\{b_i\}$. No stability-related problem arises in the foregoing even if the items of communication data $\{s_i\}$ and random-number series $\{b_i\}$ are made a plurality of bits on the order of $\log_2 n$ rather than one bit. As a consequence of the above encryption/decryption processing, the encryption unit 1127 and decryption unit 1126 can each be implemented by an exclusive-OR circuit. Further, the encryption unit 1127 and decryption unit 1126 can share the same exclusive-OR circuit, in which case the input/output of the circuit would be changed over depending upon whether the operation is encryption or decryption.

Thus, as described above, the method and apparatus for generating pseudo-random numbers of the embodiments are used when encryption/decryption processing is executed, thereby making it possible to execute encryption/decryption processing at high speed. This in turn makes it possible to raise the overall processing performance of communication processing.

Encryption/decryption processing between communication apparatus is described in the sixth embodiment. However, encryption/decryption processing between an information processing apparatus and a recording medium can be executed in a similar manner. An example of the recording medium is a magnetic recording medium such as a hard disk or floppy disk. In such case the apparatus for accessing the recording medium would correspond to the communication apparatus.

The present invention can be applied to a system constituted by a plurality of devices or to an apparatus comprising a single device. Furthermore, it goes without saying that the invention is applicable also to a case where the object of the invention is attained by supplying a program to a system or apparatus.

Though the invention has been described above in relation to a communication method and apparatus, it goes without saying that the method and apparatus for generating pseudo-random numbers according to the embodiments can be used also in processing performed by an image processing apparatus and especially in information processing such as a Monte Carlo simulation.

In accordance with the present invention, as described above, encryption/decryption processing of data can be executed at high speed. In addition, pseudo-random numbers can be generated at high speed.

As many apparently widely different embodiments of the present invention can be made without departing from the spirit and scope thereof, it is to be understood that the invention is not limited to the specific embodiments thereof except as defined in the appended claims.

Figure 7:
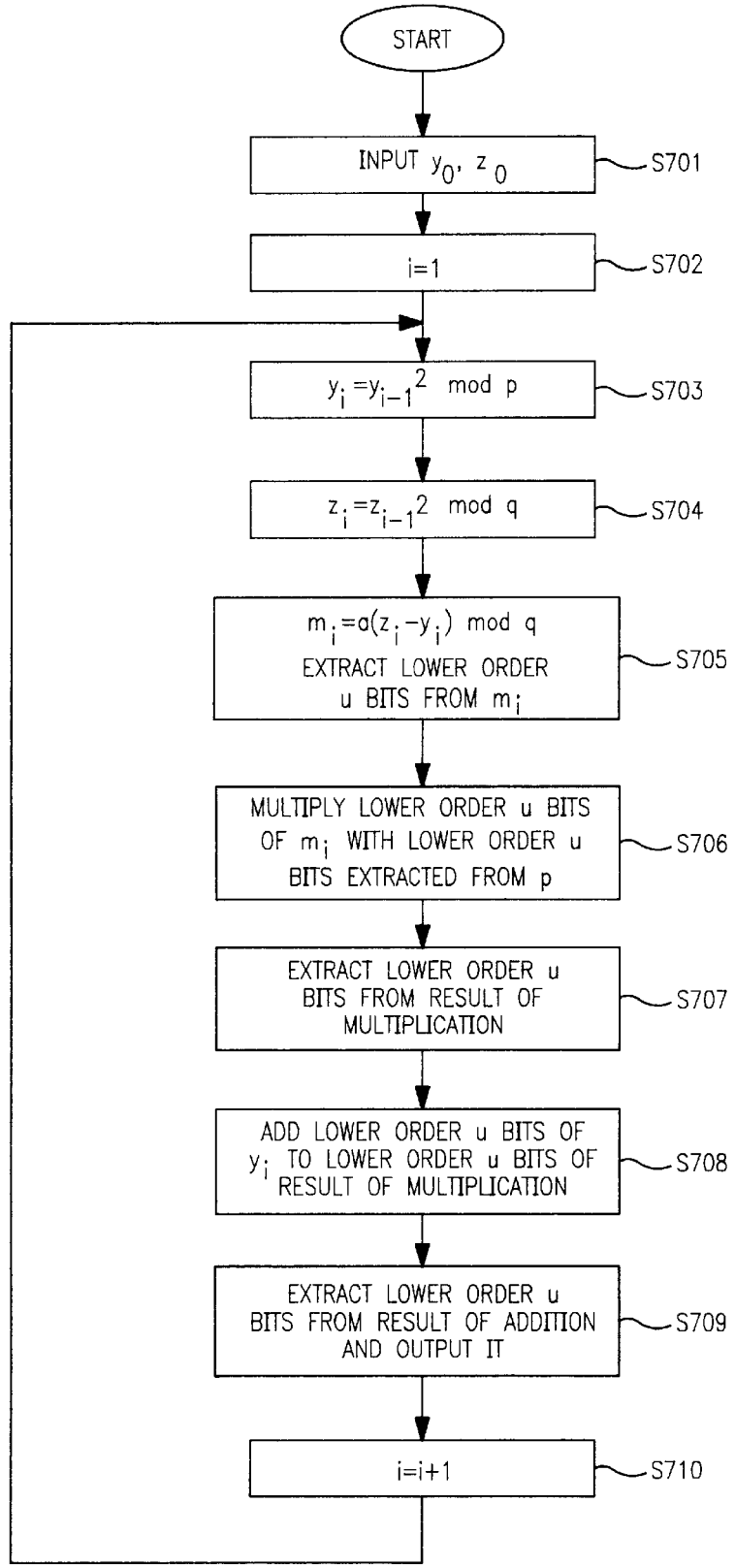
FIG. 7 is a flow diagram showing a representative embodiment of random number generation according to the invention.

FIG. 7 is a flowchart showing a random-number generating procedure by the pseudo-random number generator 30 as shown in FIG. 3.

In the initial pass, the selectors S1 and S2 select the input $y_0$ and $z_0$ respectively, and store the selected numerals, as $y_{i-1}$ and $z_{i-1}$, into the registers R1 and R2 respectively (step S701). In step S702, i is then initialized to 1.

The remainder squaring circuit Q1 calculates $y_i = y_{i-1}^2$ mod p, from a prescribed prime number p and $y_{i-1}$ stored in the register R1 (step S703). The remainder squaring circuit Q2 calculates $z_i = z_{i-1}^2$ mod q, from a prescribed prime number q and $z_{i-1}$ stored in the register R2 (step S704). The subtracting circuit Sub1 calculates $z_i - y_i$ from $y_i$ and $z_i$, and the remainder multiplying circuit M3 calculates $m = a \cdot (z_i - y_i)$ mod q by using the prescribed prime number q and a coefficient a, extracts the u lowest bits from the calculated result m, as c, and then outputs c to the multiplying circuit MUL1 (step S705).

The multiplying circuit MUL1 inputs c, and d, the u lowest bits of p, and calculates $c \cdot d$ (step S706). Then, the multiplying circuit MUL1 extracts the u lowest bits of the multiplied result, and outputs the u bits to the adder ADD1 (step S707).

The adder ADD1 inputs e, the u lowest bits of $y_i$, and adds e to the output of the multiplying circuit MUL1 (step S708). Then, the adder ADD1 extracts the u lowest bits of the added result, and outputs the u bits as a random number $b_i$ (step S709).

After the initial pass, the selectors S1 and S2 select $y_i$ and $z_i$ outputted from the remainder squaring circuits Q1 and Q2 respectively, as new $y_{i-1}$ and $z_{i-1}$, which is shown in FIG. 7 by incrementing i and returning control to step S703, and the processing is repeated.

Figure 5:
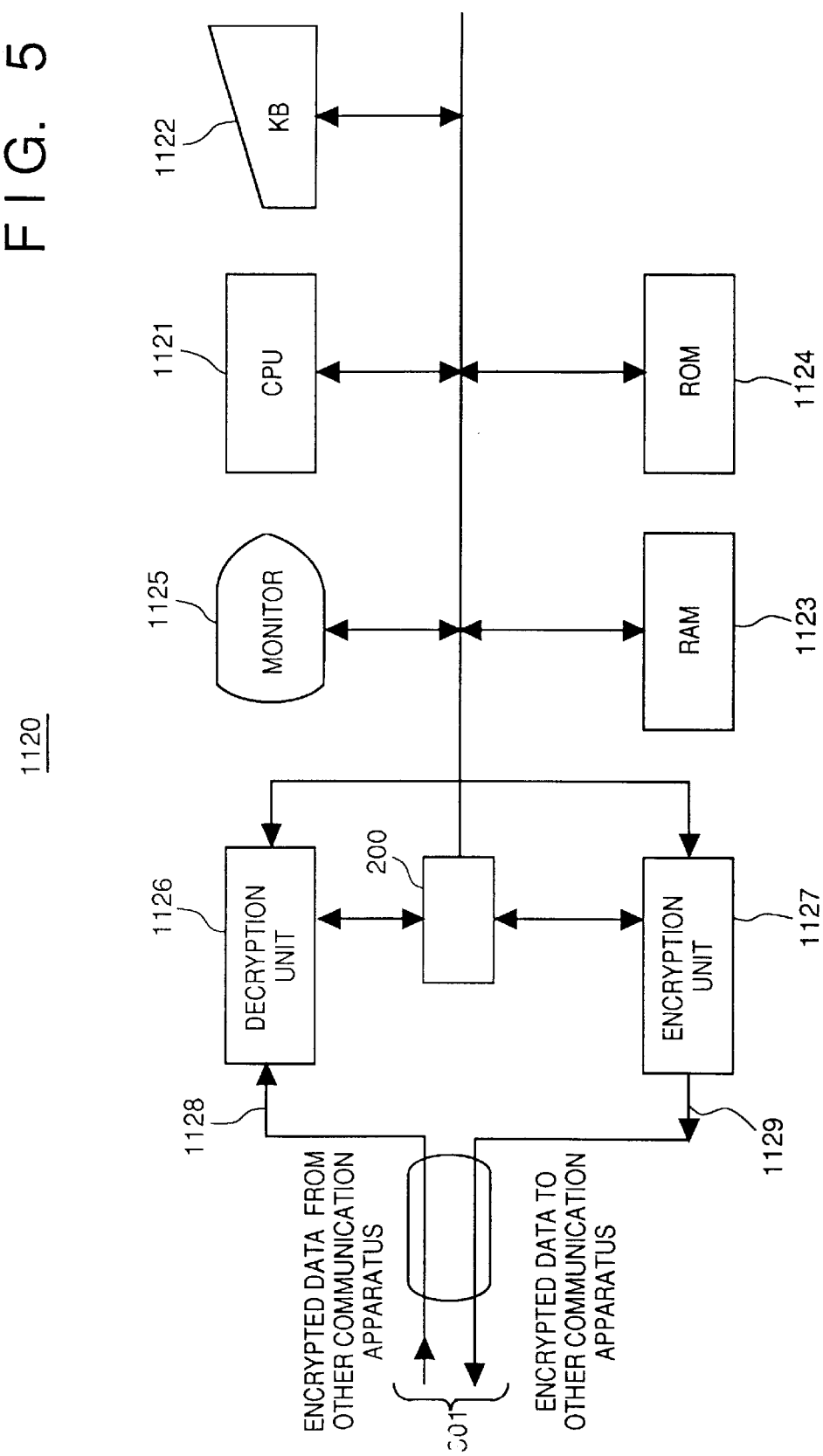
FIG. 5 is a diagram for describing the construction of a communication apparatus according to a sixth embodiment of the invention.
Figure 8:
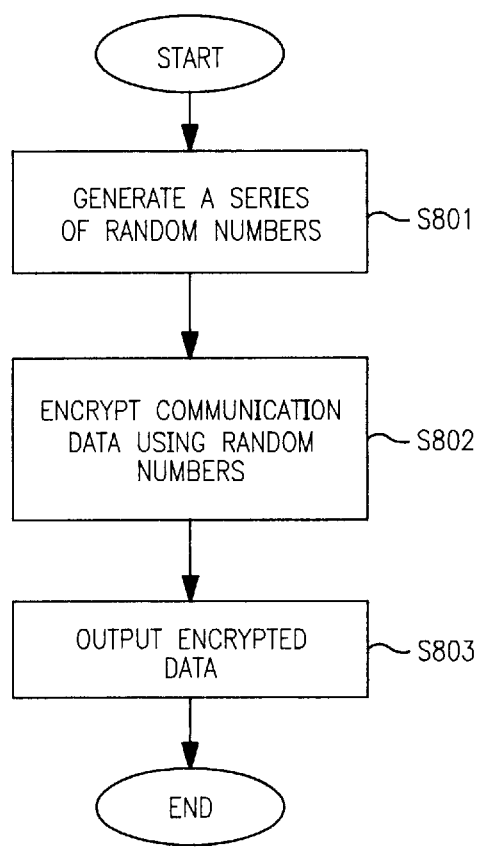
FIG. 8 is a flow diagram illustrating an encryption method according to the invention.

FIG. 8 is a flowchart showing an encryption procedure by the communication apparatus 1120 as shown in FIG. 5.

First, the pseudo-random number generator 200 generates a series of random numbers (step S801). In a case where the circuit in FIG. 3 is employed as the pseudo-random number generator 200, the series of random numbers is generated in accordance with the procedure in FIG. 7.

Next, the encryption unit 1127 encrypts communication data stored in the RAM 1123 by using the generated series of random numbers as an encryption key (step S802), and outputs the encrypted data onto the communication line 1129 (step S803).

Figure 9:
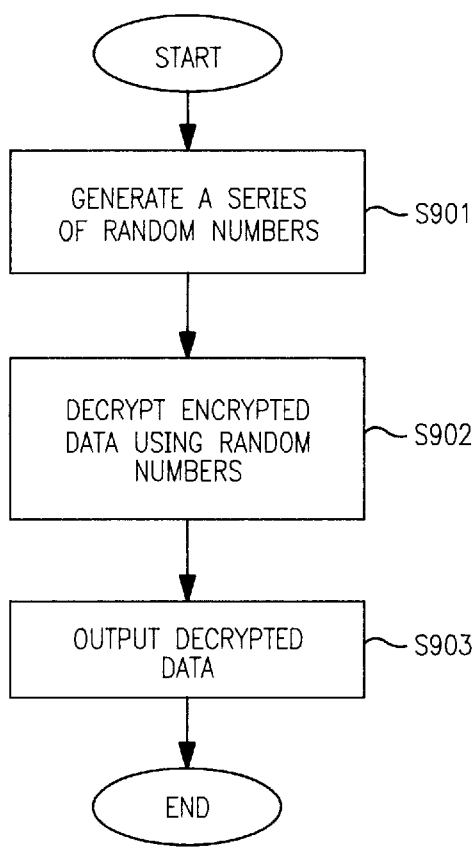
FIG. 9 is a flow diagram illustrating a decryption method according to the invention.

FIG. 9 is a flowchart showing a decryption procedure by the communication apparatus 1120 as shown in FIG. 5.

First, the pseudo-random number generator 200 generates a series of random numbers (step S901.) In a case where the circuit in FIG. 3 is employed as the pseudo-random number generator 200, the series of random number is generated in accordance with the procedure in FIG. 7.

Next, the decryption unit 1126 decrypts encrypted data transmitted via the communication line 1128 by using the generated series of random numbers as a decryption key (step S902), and outputs the decrypted data onto the communication line to store it in RAM 1123 (step S903).

What is claimed is:

1. A communication apparatus comprising:

$y_i$ operating means for outputting $y_i$ (i=1, 2, . . . , n, where n is an arbitrary integer) upon performing an operation of a recurrence formula "$y_i=f(y_{i-1})$ mod p, (i=1, 2, . . . , n)" based upon a prescribed initial value $y_0$, a prescribed prime number p and a function $f(y_{i-1})$ of $y_{i-1}$;

$z_i$ operating means for outputting $z_i$ (i=1, 2, . . . , n) upon performing an operation of a recurrence formula "$z_i=g(z_{i-1})$ mod q; (i=1, 2, . . . , n)" based upon a prescribed initial value $z_0$, a prescribed prime number q and a function $g(z_{i-1})$ of $z_{i-1}$;

$m_i$ operating means for extracting prescribed lower order bits out of $m_i$ (i=1, 2, . . . , n) upon performing an operation of a remainder formula "$m_i=a\cdot(z_i-y_i)$ mod q; (i=1, 2, . . . n)" based upon a prescribed coefficient a and the prescribed prime number q;

prescribed bit operating means for multiplying said prescribed lower order bits extracted from $m_i$ and said prescribed lower order bits extracted from the prescribed prime number p, adding prescribed lower order bits of $y_i$ to prescribed lower order bits of a result of multiplication and adopting prescribed lower order bits of a result of addition as an i-th pseudo-random number $X_i$ (i=1, 2, . . . , n);

encryption means for generating a cryptogram from a plain text on the basis of the pseudo-random number $X_i$ (i=1, 2, . . . , n) generated by said prescribed bit operating means; and output means for outputting the cryptogram, wherein the number of prescribed lower order bits is more than one and less than the minimum number of bits needed to represent "$\log_2(p\cdot q)$".

2. The apparatus according to claim 1, wherein said function $f(y_{i-1})$ is a polynomial related to $y_{i-1}$, and said function $g(z_{i-1})$ is a polynomial related to $z_{i-1}$.

3. The apparatus according to claim 1, wherein said function $f(y_{i-1})$ is a polynomial which is the square of $y_{i-1}$, and said function $g(z_{i-1})$ is a polynomial which is the square of $z_{i-1}$.

4. A communication apparatus comprising:

$y_i$ operating means for outputting $y_i$ (i=1, 2, . . . , n, where n is an arbitrary integer) upon performing an operation of a recurrence formula "$y_i=f(y_{i-1})$ mod p; (i=1, 2, . . . , n)" based upon a prescribed initial value $y_0$, a prescribed prime number p and a function $f(y_{i-1})$ of $y_{i-1}$;

$z_i$ operating means for outputting $z_i$ (i=1, 2, . . . , n) upon performing an operation of a recurrence formula "$z_i=g(z_{i-1})$ mod q; (i=1, 2, . . . , n)" based upon a prescribed initial value $z_0$, a prescribed prime number q and a function $g(z_{i-1})$ of $z_{i-1}$;

$m_i$ operating means for extracting prescribed lower order bits out of $m_i$ (i=1, 2, . . . , n) upon performing an operation of a remainder formula "$m_i=a\cdot(z_i-y_i)$ mod q; (i=1, 2, . . . n)" based upon a prescribed coefficient a and the prescribed prime number q;

prescribed bit operating means for multiplying said prescribed lower order bits extracted from $m_i$ and said prescribed lower order bits extracted from the prescribed prime number p, adding prescribed lower order bits of $y_i$ to prescribed lower order bits of a result of multiplication and adopting prescribed lower order bits of a result of addition as an i-th pseudo-random number $X_i$ (i=1, 2, . . . , n); and decryption means for generating plain text from a received cryptogram on the basis of the pseudo-random number $X_i$ (i=1, 2, . . . , n) generated by said prescribed bit operating means, wherein the number of prescribed lower order bits is more than one and less than the minimum number of bits needed to represent "$\log_2(p\cdot q)$".

5. The apparatus according to claim 4, wherein said function $f(y_{i-1})$ is a polynomial related to $y_{i-1}$, and said function $g(z_{i-1})$ is a polynomial related to $z_{i-1}$.

6. The apparatus according to claim 4, wherein said function $f(y_{i-1})$ is a polynomial which is the square of $y_{i-1}$, and said function $g(z_{i-1})$ is a polynomial which is the square of $z_{i-1}$.

7. A pseudo-random number generator for generating a stream of bit data representing a random number $X_i$ (i=1, 2, . . . , n, where n is an arbitrary integer), comprising:

$y_i$ operating means for outputting bit data $y_i$ (i=1, 2, . . . , n) upon performing an operation of a recurrence formula "$y_i=f(y_{i-1})$ mod p; (i=1, 2, . . . , n)" based upon prescribed initial bit data $y_0$, a prescribed prime number p and a function $f(y_{i-1})$ of $y_{i-1}$;

$z_i$ operating means for outputting bit data $z_i$ (i=1, 2, . . . , n) upon performing an operation of a recurrence formula "$z_i=g(z_{i-1})$ mod q; (i=1, 2, . . . , n)" based upon prescribed initial bit data $z_0$, a prescribed prime number q and a function $g(z_{i-1})$ of $z_{i-1}$;

$m_i$ operating means for extracting prescribed lower order bits out of bit data $m_i$ (i=1, 2, . . . , n) upon performing an operation of a remainder formula "$m_i=a\cdot(z_i-y_i)$ mod q; (i=1, 2, . . . , n)" based upon a prescribed coefficient a and the prescribed prime number q;

prescribed bit operating means for multiplying said prescribed lower order bits extracted from the bit data $m_i$ and said prescribed lower order bits extracted from the bit data representing p, extracting the prescribed lower order bits from a result of multiplication, adding said prescribed lower order bits extracted from the bit data $y_i$ to the prescribed lower order bits extracted from the result of multiplication; and output means for extracting the prescribed lower order bits from a result of addition and outputting said prescribed lower order bits extracted from the result of addition as bit data representing an i-th pseudo-random number $X_i$ (i=1, 2, . . . , n), wherein the number of prescribed lower order bits is more than one and less than the minimum number of bits needed to represent "$\log_2(p\cdot q)$".

8. The pseudo-random number generator according to claim 7, wherein said function $f(y_{i-1})$ is a polynomial related to $y_{i-1}$, and said function $g(z_{i-1})$ is a polynomial related to $z_{i-1}$.

9. The pseudo-random number generator according to claim 7, wherein said function $f(y_{i-1})$ is a polynomial which is the square of $y_{i-1}$, and said function $g(z_{i-1})$ is a polynomial which is the square of $z_{i-1}$.

10. A communication method comprising the steps of:

(a) outputting $y_i$ (i=1, 2, . . . , n, where n is an arbitrary integer) upon performing an operation of a recurrence formula "$y_i=f(y_{i-1})$ mod p; (i=1, 2, ..., n)" based upon a prescribed initial value $y_0$, a prescribed prime number p and a function $f(y_{i-1})$ of $y_{i-1}$;

(b) outputting $z_i$ (i=1, 2, ..., n) upon performing an operation of a recurrence formula "$z_i=g(z_{i-1})$ mod q; (i=1, 2, ..., n)" based upon a prescribed initial value $z_0$, a prescribed prime number q and a function $g(z_{i-1})$ of $z_{i-1}$;

(c) extracting prescribed lower order bits out of $m_i$ (i=1, 2, ..., n) upon performing an operation of a remainder formula "$m_i=a\cdot(z_i-y_i)$ mod q; (i=1, 2, ..., n)" based upon a prescribed coefficient a and the prescribed prime number q;

(d) multiplying prescribed lower order bits extracted from $m_i$ and prescribed lower order bits extracted from the prescribed prime number p, adding prescribed lower order bits of $y_i$ to prescribed lower order bits of a result of multiplication and adopting prescribed lower order bits of a result of addition as an i-th pseudo-random number $X_i$ (i=1, 2, ..., n);

(e) generating a cryptogram from a plain text on the basis of the pseudo-random number $X_i$ (i=1, 2, ..., n) generated at said step (d); and (f) outputting the cryptogram, wherein the number of prescribed lower order bits is more than one and less than the minimum number of bits needed to represent "$\log_2(p\cdot q)$".

11. The method according to claim 10, wherein said function $f(y_{i-1})$ is a polynomial related to $y_{i-1}$, and said function $g(zi-1)$ is a polynomial related to $z_{i-1}$.

12. The method according to claim 10, wherein said function $f(y_{i-1})$ is a polynomial which is the square of $y_{i-1}$, and said function $g(zi-1)$ is a polynomial which is the square of $z_{i-1}$.

13. A communication method comprising the steps of:

(a) outputting $y_i$ (i=1, 2, ..., n, where n is an arbitrary integer) upon performing an operation of a recurrence formula "$y_i=f(y_{i-1})$ mod p; (i=1, 2, ..., n)" based upon a prescribed initial value $y_0$, a prescribed prime number p and a function $f(y_{i-1})$ of $y_{i-1}$;

(b) outputting $z_i$ (i=1, 2, ..., n) upon performing an operation of a recurrence formula "$z_i=g(z_{i-1})$ mod q; (i=1, 2, ..., n)" based upon a prescribed initial value $z_0$, a prescribed prime number q and a function $g(z_{i-1})$ of $z_{i-1}$;

(c) extracting prescribed lower order bits out of $m_i$ (i=1, 2, ..., n) upon performing an operation of a remainder formula "$m_i=a\cdot(z_i-y_i)$ mod q; (i=1, 2, ..., n)" based upon a prescribed coefficient a and the prescribed prime number q;

(d) multiplying prescribed lower order bits extracted from $m_i$ and prescribed lower order bits extracted from the prescribed prime number p, adding prescribed lower order bits of yi to prescribed lower order bits of a result of multiplication and adopting prescribed lower order bits of a result of addition as an i-th pseudo-random number $X_i$ (i=1, 2, ..., n); and (e) generating plain text from a cryptogram on the basis of the pseudo-random number $X_i$ (i=1, 2, ..., n) generated at said step (d);

wherein the number of prescribed lower order bits is more than one and less than the minimum number of bits needed to represent "$\log_2(p\cdot q)$".

14. The method according to claim 13, wherein said function $f(y_{i-1})$ is a polynomial related to $y_{i-1}$, and said function $g(zi-1)$ is a polynomial related to $z_{i-1}$.

15. The method according to claim 13, wherein said function $f(y_{i-1})$ is a polynomial which is the square of $y_{i-1}$, and said function $g(zi-1)$ is a polynomial which is the square of $z_{i-1}$.

16. A pseudo-random number generating method for generating a stream of bit data representing a random number $X_i$ (i=1, 2, ..., n, where n is an arbitrary integer), comprising the steps of:

(a) outputting bit data $y_i$ (i=1, 2, ..., n) upon performing an operation of a recurrence formula "$y_i=f(y_{i-1})$ mod p; (i=1, 2, ..., n" based upon prescribed initial bit data $y_0$, a prescribed prime number p and a function $f(y_{i-1})$ of $y_{i-1}$;

(b) outputting bit data $z_i$ (i=1, 2, ..., n) upon performing an operation of recurrence formula "$z_i=g(z_{i-1})$ mod q; (i=1, 2, ..., n)" based upon prescribed initial bit data $z_0$, a prescribed prime number q and a function $g(z_{i-1})$ of $z_{i-1}$;

(c) extracting prescribed lower order bits out of bit data $m_i$ (i=1, 2, ..., n) upon performing an operation of a remainder formula "$m_i=a\cdot(z_i-y_i)$ mod q; (i=1, 2, ..., n)" based upon a prescribed coefficient a and the prescribed prime number q;

(d) multiplying said prescribed lower order bits extracted from the bit data $m_i$ and said prescribed lower order bits extracted from the bit data representing p, extracting the prescribed lower order bits from a result of multiplication, adding said prescribed lower order bits extracted from the bit data $y_i$ to the prescribed lower order bits extracted from the result of multiplication; and (e) extracting the prescribed lower order bits from a result of addition and outputting said prescribed lower order bits extracted from the result of addition as bit data representing an i-th pseudo-random number $X_i$ (i=1, 2, ..., n), wherein the number of prescribed lower order bits is more than one and less than the minimum number of bits needed to represent "$\log_2(p\cdot q)$".

17. The method according to claim 16, wherein said function $f(y_{i-1})$ is a polynomial related to $y_{i-1}$, and said function $g(zi-1)$ is a polynomial related to $z_{i-1}$.

18. The method according to claim 16, wherein said function $f(y_{i-1})$ is a polynomial which is the square of $y_{i-1}$, and said function $g(zi-1)$ is a polynomial which is the square of $z_{i-1}$.

19. An apparats for generating a pseudo-random number, comprising:

$y_i$ operating means for outputting $y_i$ (i=1, 2, ..., n, where n is an arbitrary integer) upon performing an operation of a recurrence formula "$y_i=f(y_{i-1})$ mod p; (i=1, 2, ..., n)" based upon a prescribed initial value $y_0$, a prescribed prime number p and a function $f(y_{i-1})$ of $y_{i-1}$;

$z_i$ operating means for outputting "$z_i$ (i=1, 2, ..., n)" upon performing an operation of a recurrence formula "$z_i=g(z_{i-1})$ mod q; (i=1, 2, ..., n)" based upon a prescribed initial value $z_0$, a prescribed prime number q and a function $g(z_{i-1})$ of $z_{i-1}$;

$m_i$ operating means for performing an operation of a remainder formula "$m_i=a\cdot(z_i-y_i)$ mod q; (i=1, 2, ..., n)" based upon a prescribed coefficient a and the prescribed prime number q;

AND operation means for performing an AND operation on a least significant bit of $m_i$ and a least significant bit of p; and EXOR operation means for performing an exclusive OR operation on a least significant bit $y_i$ and a result of the AND operation and for outputting a result of the exclusive OR operation as an i-th pseudo-random number $X_i$ (i=1, 2, ..., n).

20. The apparatus according to claim 19, further comprising:

encryption means for generating a cryptogram from a plain text on the basis of the pseudo-random number $X_i$ (i=1, 2, ..., n) generated by said EXOR operation means; and output means for outputting the cryptogram.

21. The apparatus according to claim 19, further comprising:

receiving means for receiving a cryptogram; and decryption means for generating a plain text from the received cryptogram on the basis of the pseudo-random number $X_i$ (i=1, 2, ..., n) generated by said EXOR operation means.

22. A method for generating a pseudo-random number, comprising:

outputting each of plural $y_i$ (i=1, 2, ..., n, where n is an arbitrary integer) upon performing an operation of a recurrence formula "$y_i = f(y_{i-1})$ mod p; (i=1, 2, ..., n)" based upon a prescribed initial value $y_0$, a prescribed prime number p and a function $f(y_{i-1})$ of $y_{i-1}$;

outputting each of plural "$z_i$ (i=1, 2, ..., n)" upon performing an operation of a recurrence formula "$z_i = g(z_{i-1})$ mod q; (i=1, 2, ..., n)" based upon a prescribed initial value $z_0$, a prescribed prime number q and a function $g(z_{i-1})$ of $z_{i-1}$;

performing an operation of a remainder formula "$m_i = a \cdot (z_i - y_i)$ mod q; (i=1, 2, ..., n)" based upon a prescribed coefficient a and the prescribed prime number q;

performing an AND operation on a least significant bit of $m_i$ and a least significant bit of p; and performing an exclusive OR operation on a least significant bit $y_i$ and a result of the AND operation; and outputting a result of the exclusive OR operation as an i-th pseudo-random number $X_i$ (i=1, 2, ..., n).

23. The method according to claim 22, further comprising the steps of:

generating a cryptogram from a plain text on the basis of the pseudo-random number $X_i$ (i=1, 2, ..., n) generated by said exclusive OR operation; and outputting the cryptogram.

24. The method according to claim 22, further comprising the steps of:

receiving a cryptogram; and generating a plain text from the received cryptogram on the basis of the pseudo-random number $X_i$ (i=1, 2, ..., n) generated by said exclusive OR operation.

* * * * *

UNITED STATES PATENT AND TRADEMARK OFFICE
CERTIFICATE OF CORRECTION

PATENT NO. : 5,828,752

DATED : October 27, 1998

INVENTOR(S) : KEIICHI IWAMURA ET AL.

It is certified that error appears in the above-identified patent and that said Letters Patent is hereby corrected as shown below:

COLUMN 2

Line 30, "yi" should read --$y_i$--.
   Line 31, "yi" should read --$y_i$--.

COLUMN 6

Line 11, "$z_i$-$y_i$from" should read --$z_i$-$y_i$ from--.

COLUMN 11

Line 13, "p," should read --p;--.

COLUMN 13

Line 30, "g(zi-1)" should read --g($z_{i-1}$)--.
   Line 33, "g(zi-1)" should read --g($z_{i-1}$)--.
   Line 54, "yi" should read --$y_i$--.
   Line 61, "g(zi-1)" should read --g($z_{i-1}$)--.

UNITED STATES PATENT AND TRADEMARK OFFICE
CERTIFICATE OF CORRECTION

PATENT NO. : 5,828,752

DATED : October 27, 1998

INVENTOR(S) : KEIICHI IWAMURA ET AL.

It is certified that error appears in the above-identified patent and that said Letters Patent is hereby corrected as shown below:

COLUMN 14

```
Line 3,  "g(zi-1)" should read --g(zi-1)--.
Line 42, "g(zi-1)" should read --g(zi-1)--.
Line 45, "g(zi-1)" should read --g(zi-1)--.
Line 47, "apparats" should read --apparatus--.
```

Signed and Sealed this

First Day of August, 2000

Attest:

Q. TODD DICKINSON

*Attesting Officer*     *Director of Patents and Trademarks*